US007812888B2

(12) United States Patent
Kataoka

(10) Patent No.: US 7,812,888 B2
(45) Date of Patent: Oct. 12, 2010

(54) VIDEO SIGNAL DETERMINATION DEVICE, A VIDEO DISPLAY DEVICE, A VIDEO SIGNAL DETERMINATION METHOD, AND A VIDEO DISPLAY METHOD FOR DETERMINING THE TYPE OF A VIDEO SIGNAL THAT CONTAINS A SYNCHRONIZING SIGNAL

(75) Inventor: Tooru Kataoka, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 1154 days.

(21) Appl. No.: 11/443,207

(22) Filed: May 31, 2006

(65) Prior Publication Data

US 2007/0070202 A1  Mar. 29, 2007

(30) Foreign Application Priority Data

Sep. 29, 2005  (JP) ............................ 2005-284705

(51) Int. Cl.
*H04N 5/46* (2006.01)
(52) U.S. Cl. ...................................... 348/558
(58) Field of Classification Search ................ None
See application file for complete search history.

(56) References Cited

U.S. PATENT DOCUMENTS

| | | | | | |
|---|---|---|---|---|---|
| 5,294,979 | A | * | 3/1994 | Patel et al. | 348/624 |
| 5,754,250 | A | * | 5/1998 | Cooper | 348/525 |
| 5,760,840 | A | * | 6/1998 | Tani et al. | 348/558 |
| 5,790,096 | A | * | 8/1998 | Hill, Jr. | 345/600 |
| 6,128,044 | A | * | 10/2000 | Park | 348/556 |
| 6,587,153 | B1 | * | 7/2003 | Unemura | 348/468 |
| 7,139,032 | B2 | * | 11/2006 | Unemura | 348/555 |
| 7,365,797 | B2 | * | 4/2008 | Choi et al. | 348/537 |
| 7,450,178 | B2 | * | 11/2008 | Choi et al. | 348/537 |

FOREIGN PATENT DOCUMENTS

| | | |
|---|---|---|
| CN | 1239567 A | 12/1999 |
| JP | 6-311455 | 11/1994 |
| JP | 10-271408 | 10/1998 |

(Continued)

OTHER PUBLICATIONS

Chinese Office Action dated Jan. 4, 2008 with English Translation.

(Continued)

*Primary Examiner*—Paulos M Natnael
(74) *Attorney, Agent, or Firm*—McGinn IP Law Group, PLLC

(57) ABSTRACT

A synchronization processing circuit separates synchronizing signals from an input video signal, provides the synchronizing signals to a detection circuit, and further provides the input video signal that has no synchronizing signal to a scaler circuit. The detection circuit detects the horizontal synchronization frequency, the vertical synchronization frequency, the synchronization polarity, the synchronization type (Sep, CS, or GSync), the scan type, the image line number, the synchronization type (TriSync), and the vertical synchronization width from the synchronizing signals. A CPU determines the type of input video signal based on the detection results of the detection circuit. Based on the determination results, the CPU sets the signal processing for the input video signal in the synchronization processing circuit and in the scaler circuit.

4 Claims, 14 Drawing Sheets

FOREIGN PATENT DOCUMENTS

| | | |
|---|---|---|
| JP | 2000-115575 | 4/2000 |
| JP | 2002-135681 | 5/2002 |
| JP | 2002-189465 | 7/2002 |
| JP | 2003-18555 | 1/2003 |
| JP | 2003-70018 | 3/2003 |
| JP | 2004-173215 | 6/2004 |
| JP | 2005-51543 | 2/2005 |
| JP | 2005-102022 | 4/2005 |
| JP | 2005-130237 | 5/2005 |
| JP | 2005-167676 | 6/2005 |

OTHER PUBLICATIONS

Japanese Office Action dated Sep. 29, 2009, with partial English translation.

Japanese Office Action dated May 11, 2010, with partial English translation.

\* cited by examiner

480Line

SMPTE293M_YCbCr

| | Frame Rate (Hz) | Scan | Line Freq (KHz) | Pixel Clok (MHz) | H tatal (μSec) | V Sync Width (μSec) | VSync Width (H) | TriSync | Aspect |
|---|---|---|---|---|---|---|---|---|---|
| 720×480 | 59.94 | Non-Interlace | 31.469 | 27 | 31.78 | 190.7 | 6 | × | 15X9 |

(b)

RGB signal

| | Frame Rate (Hz) | Scan | Line Freq (KHz) | Pixel Clok (MHz) | H tata (μSec) | V Sync Width (μSec) | VSync Width (H) | TriSync | Aspect |
|---|---|---|---|---|---|---|---|---|---|
| 640×480 | 59.94 | Non-Interlace | 31.469 | 25.175 | 31.78 | 63.6 | 2 | × | 4X3 |
| 640×480 | 48.874 | Non-Interlace | 24.688 | 19.750 | 40.506 | 162.03 | 4 | × | 4X3 |
| | 60.048 | Non-Interlace | 29.844 | 23.875 | 33.508 | 134.03 | 4 | × | 4X3 |
| | 59.78 | Non-Interlace | 29.531 | 23.625 | 33.862 | 135.45 | 4 | × | 4X3 |
| 848×480 | 49.74 | Non-Interlace | 24.621 | 26 | 40.615 | 203.08 | 5 | × | 16x9 |
| | 60.019 | Non-Interlace | 29.83 | 31.5 | 33.524 | 167.62 | 5 | × | 16x9 |
| | 59.996 | Non-Interlace | 29.638 | 29.875 | 33.741 | 168.70 | 5 | × | 16x9 |
| 768×480 | 49.716 | Non-Interlace | 24.609 | 23.625 | 40.635 | 243.81 | 6 | × | 16X10 |
| | 59.995 | Non-Interlace | 29.818 | 28.625 | 33.537 | 201.22 | 6 | × | 16X10 |
| | 59.987 | Non-Interlace | 29.634 | 27.5 | 33.745 | 202.47 | 6 | × | 16X10 |

Fig. 3

720Line

SMPTE293_YCbCr (a)

| | Frame Rate (Hz) | Scan | Line Freq (KHz) | Pixel Clok (MHz) | H tatal (μSec) | V Sync Width (μSec) | VSync Width (H) | TriSync | Aspect |
|---|---|---|---|---|---|---|---|---|---|
| 1280x720 | 59.94 | Non-Interlace | 44.96 | 74.25 | 22.22 | 111.1 | 5 | ○ | 16x9 |
| 1280x720 | 50 | Non-Interlace | 37.5 | 74.25 | 26.26 | 131.3 | 5 | ○ | 16x9 |

RGB signal (b)

| | Frame Rate (Hz) | Scan | Line Freq (KHz) | Pixel Clok (MHz) | H tatal (μSec) | V Sync Width (μSec) | VSync Width (H) | TriSync | Aspect |
|---|---|---|---|---|---|---|---|---|---|
| 1280x720 | 49.925 | Non-Interlace | 36.994 | 60.375 | 27.031 | 135.16 | 5 | × | 16x9 |
| | 59.915 | Non-Interlace | 44.697 | 74.375 | 22.373 | 111.87 | 5 | × | 16x9 |
| | 59.979 | Non-Interlace | 44.444 | 64 | 22.500 | 112.50 | 5 | × | 16x9 |
| 1152x720 | 49.966 | Non-Interlace | 37.024 | 54.5 | 27.009 | 162.06 | 6 | × | 16x10 |
| | 59.938 | Non-Interlace | 44.714 | 67.25 | 22.364 | 134.19 | 6 | × | 16x10 |
| | 59.916 | Non-Interlace | 44.398 | 58.25 | 22.524 | 135.14 | 6 | × | 16x10 |

Fig. 4

1080Line

SMPTE274_YCbCr (a)

| | Frame Rate (Hz) | Scan | Line Freq (KHz) | Pixel Clok (MHz) | H tatal (μSec) | V Sync Width (μSec) | VSync Width (H) | TriSync | Aspect |
|---|---|---|---|---|---|---|---|---|---|
| 1920x1080 | 59.94 | Non-Interlace | 67.94 | 148.5 | 14.81 | 74.1 | 5 | ○ | 16x9 |
| 1920x1080 | 59.94 | Interlace | 33.72 | 74.25 | 29.63 | 148.1 | 5 | ○ | 16x9 |
| 1920x1080 | 50 | Interlace | 28.13 | 74.25 | 35.56 | 177.8 | 5 | ○ | 16x9 |
| 1920x1080 | 47.95 | Interlace | 26.97 | 74.25 | 37.04 | 185.2 | 5 | ○ | 16x9 |

RGB signal (b)

| | Frame Rate (Hz) | Scan | Line Freq (KHz) | Pixel Clok (MHz) | H tatal (μSec) | V Sync Width (μSec) | VSync Width (H) | TriSync | Aspect |
|---|---|---|---|---|---|---|---|---|---|
| 1920x1080 | 49.975 | Non-Interlace | 55.572 | 141.375 | 17.995 | 89.97 | 5 | × | 16x9 |
| | 59.983 | Non-Interlace | 67.061 | 172.75 | 14.912 | 74.56 | 5 | × | 16x9 |
| | 59.988 | Non-Interlace | 66.647 | 138.625 | 15.005 | 75.02 | 5 | × | 16x9 |
| 1728x1080 | 49.965 | Non-Interlace | 55.562 | 127.125 | 17.998 | 107.99 | 5 | × | 16x10 |
| | 59.952 | Non-Interlace | 67.026 | 155.5 | 14.920 | 89.52 | 6 | × | 16x10 |
| | 59.95 | Non-Interlace | 66.605 | 125.75 | 15.014 | 90.08 | 6 | × | 16x10 |

Fig. 6

480Line DETERMINATION RESULTS

SMPTE293M_YCbCr

| | Frame Rate(Hz) | Scan | Line Freq(KHz) | Color(RGB/YcbCr) | Aspect |
|---|---|---|---|---|---|
| 720x480 | 59.94 | Non-Interlace | 31.469 | ○ | ○ |

RGB SIGNAL

| | Frame Rate(Hz) | Scan | Line Freq(KHz) | Color(RGB/YcbCr) | Aspect |
|---|---|---|---|---|---|
| 640x480 | 59.94 | Non-Interlace | 31.469 | × | × |
| 640x480 | 48.874 | Non-Interlace | 24.688 | × | × |
|  | 60.048 | Non-Interlace | 29.844 | ○ | ○ |
|  | 59.78 | Non-Interlace | 29.531 | ○ | ○ |
| 848x480 | 49.74 | Non-Interlace | 24.621 | × | × |
|  | 60.019 | Non-Interlace | 29.83 | ○ | × |
|  | 59.996 | Non-Interlace | 29.638 | ○ | × |
| 768x480 | 49.716 | Non-Interlace | 24.609 | × | × |
|  | 59.995 | Non-Interlace | 29.818 | ○ | × |
|  | 59.987 | Non-Interlace | 29.634 | ○ | × |

Fig. 8

720Line

SMPTE293_YcbCr

| Frame Rate (Hz) | Scan | Line Freq (KHz) | Color (RGB/YcbCr) | Aspect |
|---|---|---|---|---|
| 1280x720 | 59.94 | Non-Interlace | 44.96 | ○ | ○ |
| 1280x720 | 50 | Non-Interlace | 37.5 | ○ | ○ |

RGB signal

| Frame Rate (Hz) | | Scan | Line Freq (KHz) | Color (RGB/YcbCr) | Aspect |
|---|---|---|---|---|---|
| 1280x720 | 49.925 | Non-Interlace | 36.994 | × | ○ |
| | 59.915 | Non-Interlace | 44.697 | × | ○ |
| | 59.979 | Non-Interlace | 44.444 | × | ○ |
| 1152x720 | 49.966 | Non-Interlace | 37.024 | × | × |
| | 59.938 | Non-Interlace | 44.714 | × | × |
| | 59.916 | Non-Interlace | 44.393 | × | × |

Fig. 10

1080Line

SMPTE274_YcbCr

|  | Frame Rate (Hz) | Scan | Line Freq (KHz) | Color (RGB/YcbCr) | Aspect |
|---|---|---|---|---|---|
| 1920×1080 | 59.94 | Non-Interlace | 67.94 | ○ | ○ |
| 1920×1080 | 59.94 | Interlace | 33.72 | ○ | ○ |
| 1920×1080 | 50 | Interlace | 28.13 | ○ | ○ |
| 1920×1080 | 47.95 | Interlace | 26.97 | ○ | ○ |

RGB signal

|  | Frame Rate (Hz) | Scan | Line Freq (KHz) | Color (RGB/YcbCr) | Aspect |
|---|---|---|---|---|---|
| 1920×1080 | 49.975 | Non-Interlace | 55.572 | ○ | ○ |
|  | 59.983 | Non-Interlace | 67.061 | × | ○ |
|  | 59.988 | Non-Interlace | 66.647 | × | ○ |
| 1728×1080 | 49.965 | Non-Interlace | 55.567 | ○ | × |
|  | 59.952 | Non-Interlace | 67.026 | × | × |
|  | 59.95 | Non-Interlace | 66.605 | × | × |

VIDEO SIGNAL DETERMINATION DEVICE, A VIDEO DISPLAY DEVICE, A VIDEO SIGNAL DETERMINATION METHOD, AND A VIDEO DISPLAY METHOD FOR DETERMINING THE TYPE OF A VIDEO SIGNAL THAT CONTAINS A SYNCHRONIZING SIGNAL

BACKGROUND OF THE INVENTION

1. Field of the Invention

The present invention relates to a video signal determination device, a video display device, a video signal determination method, and a video display method; and particularly to a video signal determination device, a video display device, a video signal determination method, and a video display method in which the type of a video signal that includes a synchronizing signal is determined.

2. Description of the Related Art

Video signal determination devices, which determine the type of video signals that contain synchronizing signals, are known in the prior art.

A video signal determination device is incorporated in a video display device (such as a projector) that can receive a plurality of types of video signals (for example, RGB signals and YCbCr signals).

An RGB signal includes color signals for the three primary colors R (red), G (green), and B (blue), and a plurality of synchronizing signals. On the other hand, a YCbCr signal (hereinbelow referred to as a "component signal") includes a Y (luminance) signal, a Cr(R-Y) color difference signal, a Cb (B-Y) color difference signal, and a plurality of synchronizing signals.

In a video display device, the type of video signal received as input is determined by a video signal determination device. The video display device switches image processing in accordance with these determination results and thus displays the video image.

FIG. 1 is a block diagram showing a video display device.

In FIG. 1, the video display device includes: input terminal 1, RGB/YCbCr video synchronization processing circuit (hereinbelow referred to as a "synchronization processing circuit") 2, detection circuit 3, CPU 400, scaler circuit 5, fixed pixel panel drive circuit (hereinbelow referred to as "drive circuit") 6, and fixed pixel panel (hereinbelow referred to as "panel") 7.

Input terminal 1 receives RGB signals and component signals. As an example, input terminal 1 receives an RGB signal from a PC, or receives a component signal from a DVD player.

Explanation here regards the video signals that are received by input terminal 1 (RGB signals and component signals).

FIG. 2(a) is an explanatory view of a component signal (YCbCr signal) having 480 rows of image lines. FIG. 2(b) is a view for explaining an RGB signal having 480 rows of image lines.

FIG. 3(a) is a view for explaining a component signal (YCbCr signal) having 720 rows of image lines, and FIG. 3(b) is a view for explaining an RGB signal having 720 rows of image lines.

FIG. 4(a) is a view for explaining a component signal (YCbCr signal) having 1080 rows of image lines, and FIG. 4(b) is a view for explaining an RGB signal having 1080 rows of image lines.

Synchronization processing circuit 2 separates the synchronizing signals from the video signal that is received by input terminal 1 (hereinbelow referred to as the "input video signal"). Synchronization processing circuit 2 provides the synchronizing signals to detection circuit 3. Synchronization processing circuit 2 further provides the input video signal, which has no synchronizing signal, to scaler circuit 5.

Detection circuit 3 includes: horizontal/vertical frequency detection circuit (hereinbelow referred to as simply "detection circuit") 31, synchronization polarity detection circuit (hereinbelow referred to as simply "detection circuit") 32, synchronization type detection circuit (hereinbelow referred to as simply "detection circuit") 33, scan type detection circuit (hereinbelow referred to as simply "detection circuit") 34, and image line number detection circuit (hereinbelow referred to as simply "detection circuit") 35.

From the synchronizing signals, detection circuit 31 detects the horizontal synchronization frequency ("Line Freq" in FIGS. 2 to 4) and the vertical synchronization frequency ("Frame Rate" in FIGS. 2 to 4), and provides this horizontal synchronization frequency and vertical synchronization frequency to CPU 400.

Detection circuit 32 detects the synchronization polarity ("Nega" or "Posi") from the synchronizing signals and provides this synchronization polarity to CPU 400.

Detection circuit 33 detects the synchronization type (Sep {horizontal and vertical frequencies}, CS {composite synchronization}, or GSync {Green synchronization}) from the synchronizing signals and provides this synchronization type to CPU 400.

Detection circuit 34 detects the scan type (Interlace or Non-interlace) from the synchronizing signals and provides this scan type to CPU 400.

Detection circuit 35 detects the number of image lines from the synchronizing signals and provides this image line number to CPU 400.

CPU 400 determines the type of input video signal based on the information that has been provided from detection circuit 3. More specifically, CPU 400 determines the type of input video signal based on the horizontal synchronization frequency, vertical synchronization frequency, synchronization polarity, synchronization type, scan type, and image line number.

CPU 400 further sets the signal processing corresponding to the input video signal based on the determination results, i.e., the type of input video signal.

For example, based on these determination results, CPU 400 sets the frequency division ratio and phase in an A/D converter (not shown) of synchronization processing circuit 2. By setting the frequency division ratio and phase in synchronization processing circuit 2, CPU 400 causes synchronization processing circuit 2 to execute a synchronization operation that is appropriate to the type of input video signal.

Based on these determination results, CPU 400 further sets resolution conversion data, the aspect ratio, and the color system, which indicates whether the input video signal is an RGB signal or a YCbCr signal, in scaler circuit 5. The aspect ratio is included in the determination results.

For example, upon determining that the input video signal is an RGB signal, CPU 400 sets "100% scan of the panel" as the resolution conversion data to scaler circuit 5, and in addition, performs color system settings indicating that the input video signal is an RGB signal.

On the other hand, upon determining that the input video signal is a YCbCr signal, CPU 400 sets "105% overscan of the panel" as the resolution conversion data to scaler circuit 5, and further performs color system settings indicating that the input video signal is a YCbCr signal that is to be converted to an RGB signal.

Scaler circuit 5 processes the input video signal based on the settings that have been carried out by CPU 400. By processing the input video signal, scaler circuit 5 generates a video display signal to show an image. Scaler circuit 5 provides this video display signal to drive circuit 6.

For example, when resolution conversion is set, scaler circuit 5 converts the resolution of the input video signal.

When the aspect ratio is set, scaler circuit 5 converts the aspect ratio of the image that corresponds to the input video signal into the aspect ratio that has been set.

When color system settings, which indicate that the input video signal is an RGB signal, have been carried out, scaler circuit 5 does not convert the RGB signal into another video signal format.

When color system settings, which indicate that the input video signal is a YCbCr signal that is to be converted to an RGB signal, have been carried out, scaler circuit 5 converts the YCbCr signal into an RGB signal.

Drive circuit 6 drives panel 7 based on the video display signal to form an image on panel 7.

The image that is formed on panel 7 is, for example, projected onto screen 8 by means of a projection light source (not shown).

Explanation here regards the process of determining the input video signal that is carried out by CPU 400.

CPU 400 first determines that the input video signal is an RGB signal when the synchronization type of the input video signal is "Sep" or "CS." CPU 400 next determines the type of input video signal based on the synchronization polarity, vertical synchronizing signal, horizontal synchronizing signal, image line number, and scan type.

When the synchronization type is "GSync" (Green signal synchronization), CPU 400 first determines whether the image line number is 480, 720, or 1080.

FIG. 5 is a flow chart explaining the operation for determining the type of input video signal that is executed when the image line number is 480. The following explanation regards the determination operation when the image line number is 480 with reference to FIG. 5.

CPU 400 carries out Step 1011 when the image line number is 480 rows.

In Step 1011, CPU 400 determines whether the vertical synchronization frequency is 60 Hz. CPU 400 executes Step 1012 when the vertical synchronization frequency is 60 Hz, and executes Step 1013 when the vertical synchronization frequency is not 60 Hz.

In Step 1012, CPU 400 determines whether the horizontal synchronization frequency is 31 KHz or not. When the horizontal synchronization frequency is 31 KHz, CPU 400 executes Step 1014, and when the horizontal synchronization frequency is not 31 KHz, CPU 400 executes Step 1013.

In Step 1013, CPU 400 determines that the input video signal is an RGB of the "GSync" synchronization type, and moreover, determines that the aspect is 4:3.

In Step 1014, CPU 400 determines that the input video signal is a YCbCr signal (component signal) having a vertical synchronization frequency of 60 Hz, and moreover, determines that the aspect is 16:9.

FIG. 6 is an explanatory view showing the determination results when the image line number is 480 rows.

As shown in FIG. 6, component signal (YCbCVr signal) of 720×480 (60 Hz) is correctly determined. For an RGB signal having synchronization type "GSync," however, the signals that are different from 640×480 (60.048 Hz) and 640×480 (59.78 Hz) cannot be correctly determined for aspect and color system (RGB signal or YCbCr signal).

FIG. 7 is a flow chart explaining the operation for determining the type of input video signal that is carried out when the image line number is 720 rows. The following explanation relates to the determination operation when the image line number is 720 rows with reference to FIG. 7.

CPU 400 executes Step 1021 when the image line number is 720 rows.

In Step 1021, CPU 400 determines whether the vertical synchronization frequency is 50 Hz. CPU 400 executes Step 1022 upon determining that the vertical synchronization frequency is 50 Hz, and executes Step 1023 upon determining that the vertical synchronization frequency is not 50 Hz.

In Step 1022, CPU 400 determines whether the horizontal synchronization frequency is 37.5 KHz. CPU 400 executes Step 1024 upon determining that the horizontal synchronization frequency is 37.5 KHz, and executes Step 1025 upon determining that the horizontal synchronization frequency is not 37.5 KHz.

In Step 1024, CPU 400 determines that the input video signal is a YCbCr signal having a vertical synchronization frequency of 50 Hz, and moreover, determines that the aspect is 16:9.

In Step 1025, CPU 400 determines that the input video signal is an RGB signal of the "GSync" synchronization type, and moreover, determines that the aspect is 4:3.

In Step 1023, CPU 400 determines whether the vertical synchronization frequency is 60 Hz. CPU 400 executes Step 1026 if the vertical synchronization frequency is 60 Hz, and executes Step 1025 if the vertical synchronization frequency is not 60 Hz.

In Step 1026, CPU 400 determines whether the horizontal synchronization frequency is 44.96 KHz. CPU 400 executes Step 1027 if the horizontal synchronization frequency is 44.96 KHz, and executes Step 1025 if the horizontal synchronization frequency is not 44.96 KHz.

In Step 1027, CPU 400 determines that the input video signal is a YCbCr signal having a vertical synchronization frequency of 60 Hz, and moreover, determines that the aspect is 16:9.

FIG. 8 is an explanatory view showing the determination results when the image line number is 720 rows.

As shown in FIG. 8, a component signal of 1280×720 (50/60 Hz) is correctly determined. However, in regard to RGB signals of the "GSync" synchronization type and of 1152×720 (50/60 Hz), aspect and color system are not correctly determined.

FIG. 9 is a flow chart explaining the operation for determining the type of input video signal when the image line number is 1080 rows. Referring to FIG. 9, the following explanation regards the determination operations when the image line number is 1080 rows.

When the image line number is 1080 rows, CPU 400 executes Step 1031.

In Step 1031, CPU 400 determines whether the scan type is Interlace. If the scan type is Interlace, CPU 400 executes Step 1032, but executes Step 1033 if the scan type is not Interlace.

In Step 1033, CPU 400 determines whether the horizontal synchronization frequency is 67 KHz, and moreover, determines whether the vertical synchronization frequency is 60 Hz. When the horizontal synchronization frequency is 67 KHz, and moreover, when the vertical synchronization frequency is 60 Hz, CPU 400 executes Step 1034. If the horizontal synchronization frequency is not 67 KHz, CPU 400 executes Step 1035, and if the vertical synchronization frequency is not 60 Hz, CPU 400 executes Step 1035.

In Step 1034, CPU 400, determines that the input video signal is a YCbCr signal in which the vertical synchronization frequency is 60 Hz and the scan type is "Non-interlace," and moreover, determines that the aspect is 16:9.

In Step 1035, CPU 400 determines that the input video signal is an RGB signal whose synchronization type is "GSync," and moreover, determines that the aspect is 4:3.

In Step 1032, CPU 400 determines whether the horizontal synchronization frequency is 27 KHz, and moreover, determines whether the vertical synchronization frequency is 48 Hz. If the horizontal synchronization frequency is 27 KHz, and moreover, if the vertical synchronization frequency is 48 Hz, CPU 400 executes Step 1036. If the horizontal synchronization frequency is not 27 KHz, CPU 400 executes Step 1037, and if the vertical synchronization frequency is not 48 Hz, CPU 400 executes Step 1037.

In Step 1036, CPU 400 determines that the input video signal is a YCbCr signal in which the vertical synchronization frequency is 60 Hz and the scan type is "Interlace," and moreover, determines that the aspect is 16:9.

In Step 1037, CPU 400 determines whether the horizontal synchronization frequency is 28 KHz, and moreover, determines whether the vertical synchronization frequency is 50 Hz. If the horizontal synchronization frequency is 28 KHz, and moreover, if the vertical synchronization frequency is 50 Hz, CPU 400 executes Step 1038. If the horizontal synchronization frequency is not 28 KHz, CPU 400 executes Step 1039, and if the vertical synchronization frequency is not 50 Hz, CPU 400 executes Step 1039.

In Step 1038, CPU 400 determines that the input video signal is a YCbCr signal whose vertical synchronization frequency is 50 Hz whose scan type is "Interlace," and moreover, determines that the aspect is 16:9.

In Step 1039, CPU 400 determines whether the horizontal synchronization frequency is 33 KHz, and moreover, determines whether the vertical synchronization frequency is 60 Hz. If the horizontal synchronization frequency is 33 KHz, and moreover, if the vertical synchronization frequency is 60 Hz, CPU 400 executes Step 1040. If the horizontal synchronization frequency is not 33 KHz, CPU 400 executes Step 1041, or if the vertical synchronization frequency is not 60 Hz, CPU 400 executes Step 1041.

In Step 1040, CPU 400 determines that the input video signal is a YCbCr signal in which the vertical synchronization frequency is 60 Hz and in which the scan type is "Interlace," and moreover, determines that the aspect is 16:9.

In Step 1041, CPU 400 determines that the input video signal is an RGB signal whose synchronization type is "GSync," and moreover, determines that the aspect is 4:3.

FIG. 10 is an explanatory view showing the determination results when the image line number is 1080.

As shown in FIG. 10, a component signal of 1920×1080 (48/50 Hz) and 1920×1080 (60 Hz) is correctly determined. However, signals, which differ from 1920×1080 (49.975 Hz) in an RGB signal in which the synchronization type is "GSync", are not correctly determined for aspect or color system.

In addition, JP-A-2005-167676 discloses a video signal determination device that is incorporated in a projector.

This video signal determination device calculates the probability that the input video signal is an RGB signal (RGB probability) and the probability that the input video signal is a Y/color difference signal (color difference probability). This video signal determination device compares the RGB probability and color-difference probability to determine whether the input video signal is an RGB signal or a Y/color difference signal.

In the determination method that is executed by CPU 400 that is shown in FIG. 1, when an RGB signal is applied as input in which the synchronization type is "GSync" and the timing of the horizontal synchronization frequency and vertical synchronization frequency approaches that of a component signal, the aspect is forcibly determined to be 16:9, and the color system is determined as YCbCr.

As a result, an RGB signal in which the synchronization type is "GSync" is not accurately determined. In addition to this erroneous determination, the image cannot be properly displayed in accordance with the input video signal.

In such cases, the user must either switch the aspect and color system manually, or set the synchronization type of the RGB signal to "Sep" or "CS."

The determination method that is described in JP-A-2005-167676 requires complex processing for both calculating RGB probability and color difference probability and then determining the type of input video signal that is based on these calculation results.

SUMMARY OF THE INVENTION

It is an object of the present invention to provide a video signal determination device, a video signal determination method, an image display device, and an image display method that can determine the type of input video signal with high accuracy without using RGB probability or color difference probability.

To achieve the above-described object, the video signal determination device according to the present invention includes: a synchronization separator, a detector, and a determination unit. The synchronization separator separates the synchronizing signals from the video signal that contains the synchronizing signals. The detector detects the synchronization type and vertical synchronizing signal width that are contained in the synchronizing signals that have been separated by the synchronization separator. The determination unit determines the type of video signal based on the detection results of the detector.

For example, as shown in FIGS. 2a, 2b, 3a, 3b, 4a, and 4b, if the synchronization type (TriSync) and the vertical synchronizing signal width are used for discrimination, it is possible to discriminate between a component signal and a RGB signal in which the synchronization type is "GSync," and moreover, in which the timing of the horizontal synchronization frequency and vertical synchronization frequency approaches that of a component signal.

According to the above-described invention, the type of video signal is determined based on the synchronization type and vertical synchronizing signal width.

As a result, an RGB signal can be accurately determined based on the synchronization type (TriSync) and the vertical synchronizing signal width.

In addition, the present invention can eliminate the need for complex processing, which was required in the prior art, in which the RGB probability and color difference probability were calculated and the type of input video signal was then determined based on these calculation results.

Accordingly, the video signal type can be determined with high accuracy without using RGB probability and color-difference probability.

The image display device according to the present invention includes a processor, a display unit, a synchronization separator, a detector, and an image control unit. The processor processes a video signal that contains synchronizing signals. The display unit displays images based on the video signal that has been processed by the processor. The synchronization separator separates the synchronizing signals from the video signal. The detector detects the synchronization type and vertical synchronizing signal width that are contained in the synchronizing signals that have been separated by the synchronization separator. The image control unit determines the type of video signal based on the detection results of the detector and controls the processor based on these determination results.

According to the above-described invention, the type of video signal is determined based on the synchronization type and vertical synchronizing signal width, and the processing of the video signal is controlled based on these determination results. As a result, the type of video signal can be determined with high accuracy without using RGB probability and the color-difference probability. Images can thus be accurately displayed according to the video signal.

Preferably, the detector further detects the horizontal synchronization frequency, vertical synchronization frequency, synchronization polarity, scan type, and image line number that are contained in the synchronizing signals.

According to the invention, the type of video signal can be determined with high accuracy.

In addition, the video signal is preferably an RGB signal or a YCbCr signal, and the detector preferably detects each "Nega" and "Posi" as the synchronization polarity, detects each "Sep," "CS," "GSync," and "TriSync" as the synchronization type, and detects each "Interlace" and "Non-Interlace" as the scan type.

According to the invention, the type of video signal can be determined with high accuracy without confusion between RGB signals and YCbCr signals.

Still further, the image control unit preferably determines the aspect and type of the video signal according to the determination results, and the processor preferably processes the video signal according to the aspect and type of the video signal.

According to the invention, images can be accurately displayed according to the video signal.

The above and other objects, features, and advantages of the present invention will become apparent from the following description with reference to the accompanying drawings which illustrate an example of the present invention.

BRIEF DESCRIPTION OF THE DRAWINGS:

FIG. 2 is an explanatory view explaining a video signal having 480 rows of image lines;

FIG. 3 is an explanatory view explaining a video signal having 720 rows of image lines;

FIG. 4 is an explanatory view explaining a video signal having 1080 rows of image lines;

FIG. 6 is an explanatory view showing the determination results;

FIG. 8 is an explanatory view showing the determination results;

FIG. 10 is an explanatory view showing the determination results;

DETAILED DESCRIPTION OF THE PREFERRED EMBODIMENTS

Figure 11:
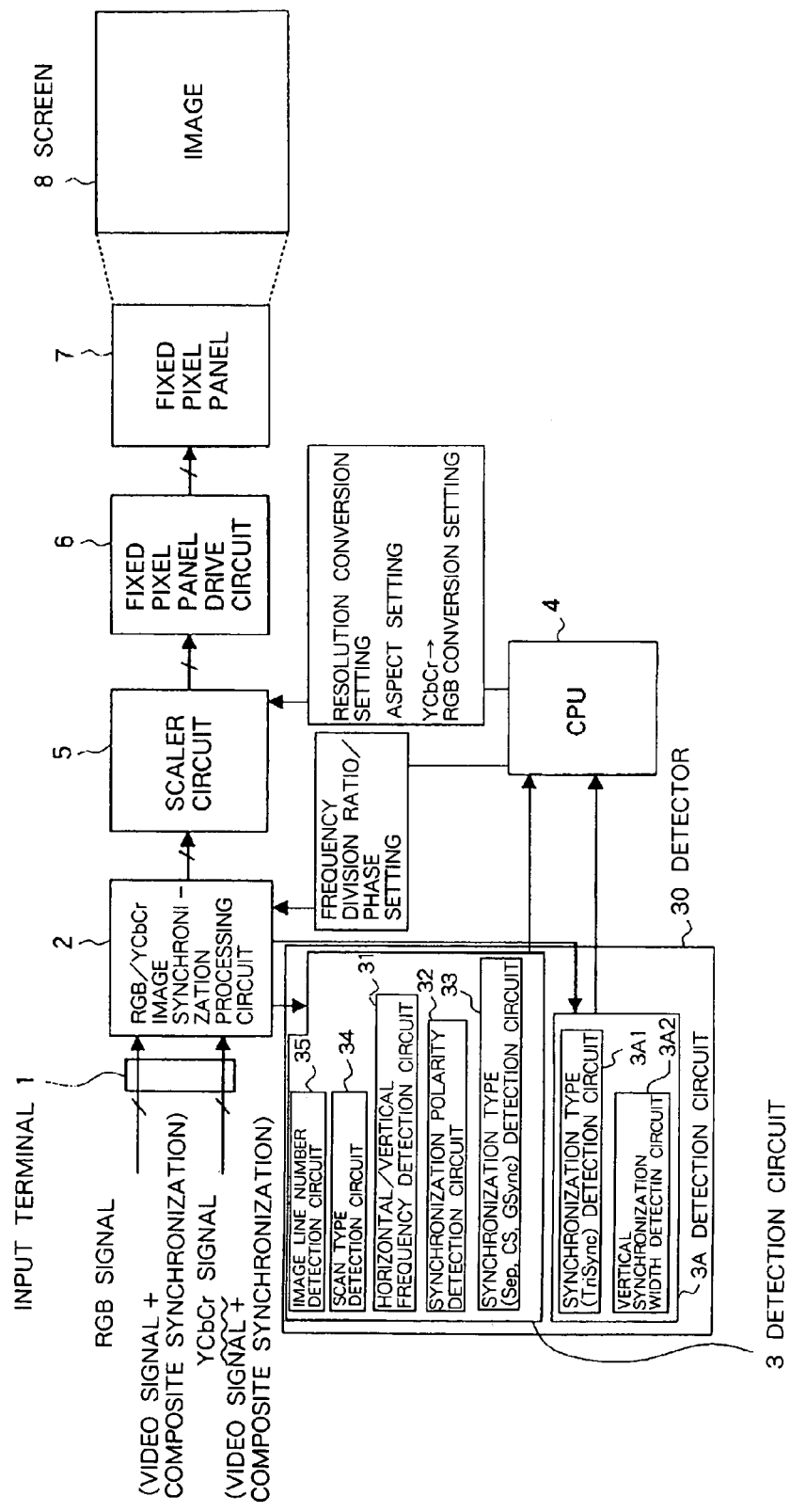
FIG. 11 is a block diagram showing the image display device of a working example of the present invention.

FIG. 11 is a block diagram showing an image display device according to an example of the present invention. In FIG. 11, components that are identical to components shown in FIG. 1 are given the same reference numbers.

Figure 1:
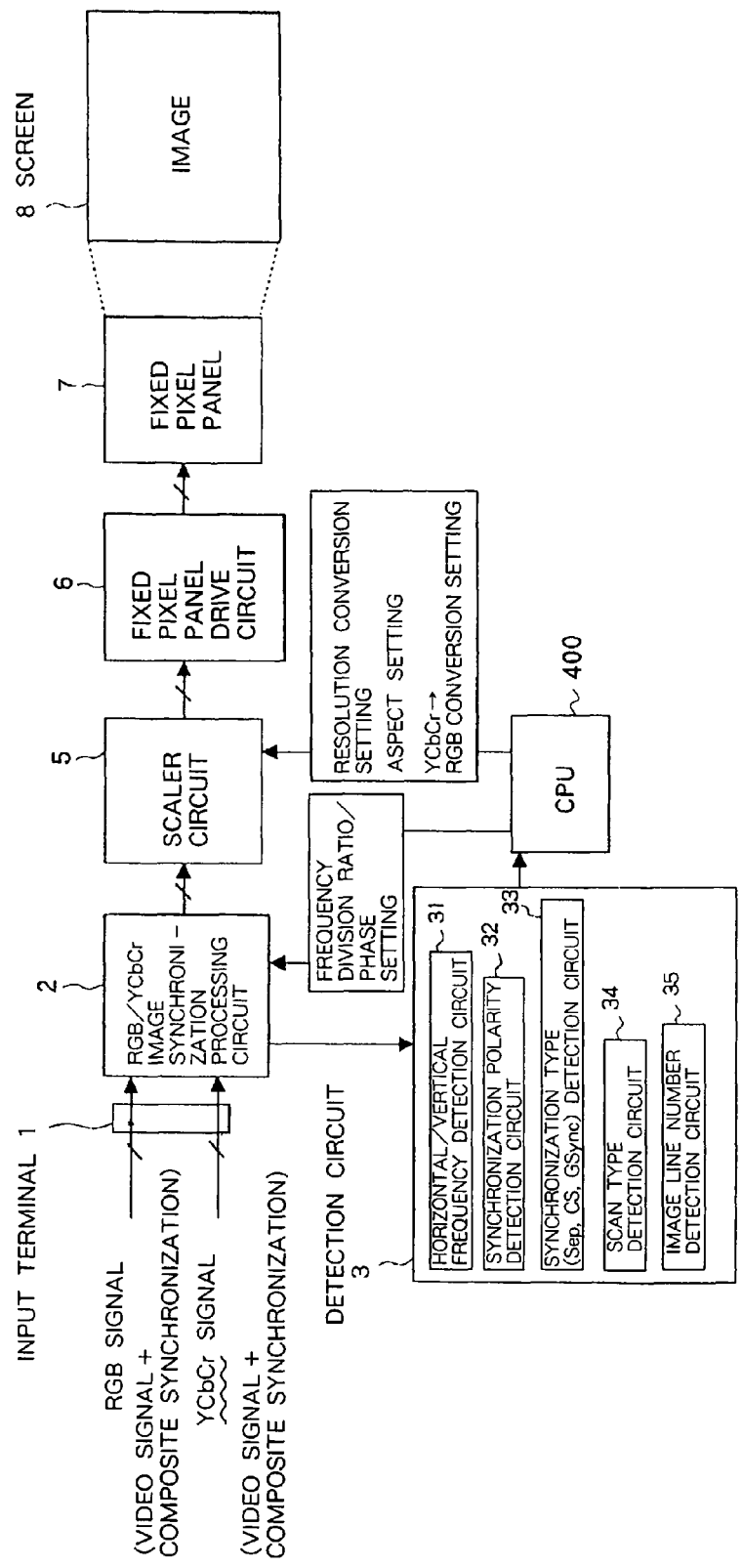
FIG. 1 is a block diagram showing an image display unit.
Figure 5:
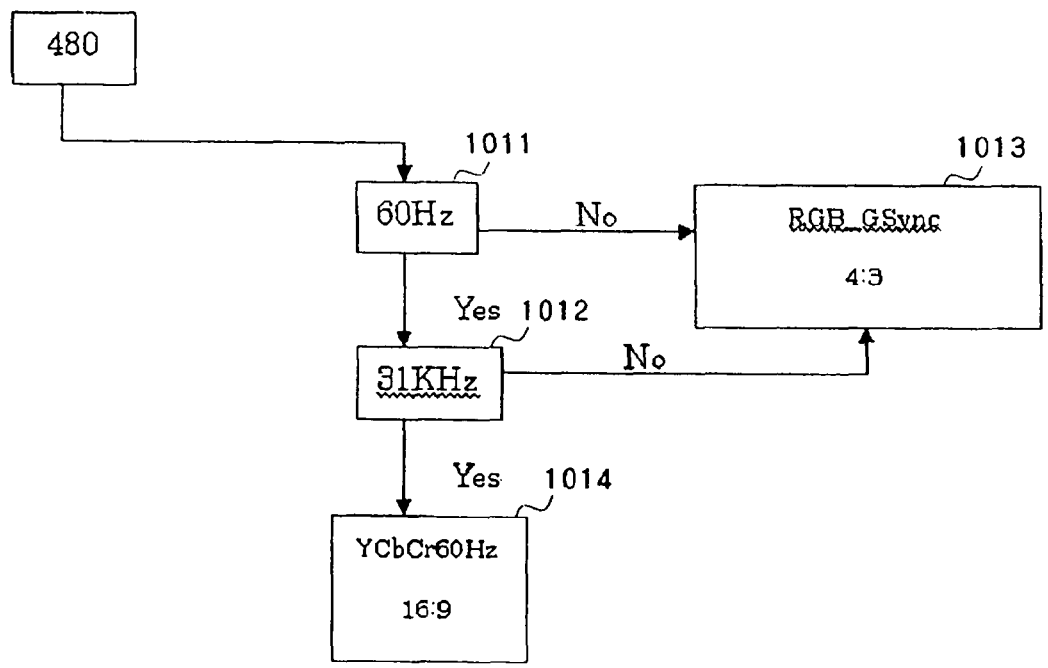
FIG. 5 is a flow chart explaining the operation of determining the type of input video signal.
Figure 7:
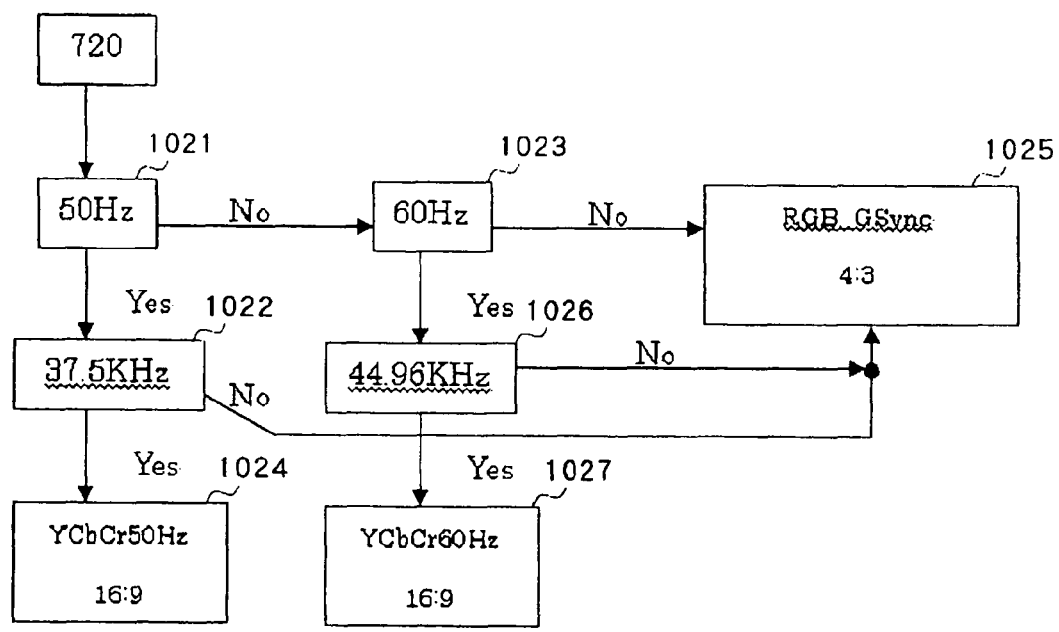
FIG. 7 is a flow chart explaining the operation for determining the type of input video signal.
Figure 9:
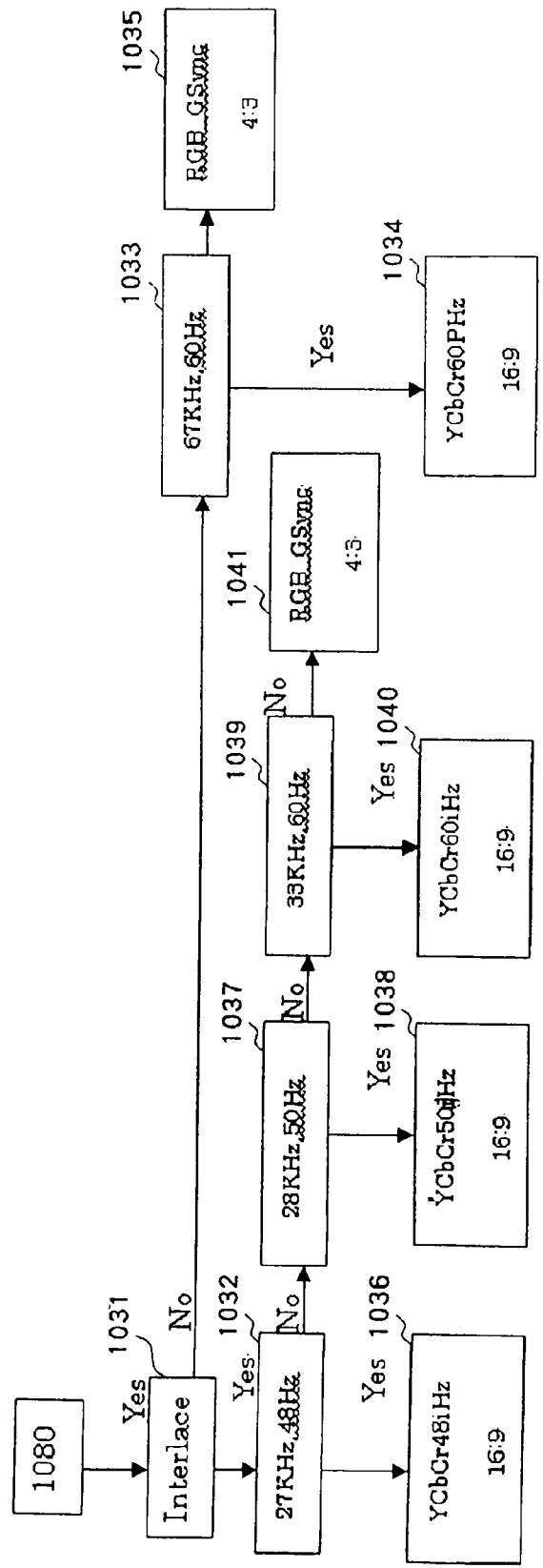
FIG. 9 is a flow chart explaining the operation for determining the type of input video signal.

Referring to FIG. 11, in this image display device, detection circuit 3A has been added to the image display device shown in FIG. 1 and CPU 400 has been altered to CPU 4. The following explanation focuses on the points of difference with the image display device shown in FIG. 1.

This image display device includes: input terminal 1, synchronization processing circuit 2, detector 30, CPU 4, scaler circuit 5, drive circuit 6, and panel 7. Detector 30 includes detection circuit 3 and detection circuit 3A.

The video signal determination device is made up from synchronization processing circuit 2, detector 30, and CPU 4. In addition, scaler circuit 5 is one example of a processor. The control unit is composed of detector 30 and CPU 4.

Synchronization processing circuit 2 is one example of a synchronization separator. Synchronization processing circuit 2 separates synchronizing signals from an input video signal that contains the synchronizing signals. Synchronization processing circuit 2 provides the synchronizing signals to detection circuit 3 and detection circuit 3A.

Detection circuit 3A includes: synchronization type detection circuit (hereinbelow referred to as simply "detection circuit") 3A1, and vertical synchronization width detection circuit (hereinbelow referred to as simply "detection circuit") 3A2.

Detection circuit 3A1 detects the synchronization type (TriSync) from the synchronizing signals and provides this synchronization type to CPU 4.

Detection circuit 3A2 detects the vertical synchronization width (VSync Width shown in FIGS. 2a, 2b, 3a, 3b, 4a, and 4b) from the synchronizing signals and supplies this vertical synchronization width to CPU 4.

CPU 4 is one example of a determination unit and image control unit.

CPU 4 determines the type of input video signal based on the horizontal synchronization frequency, vertical synchronization frequency, synchronization polarity that is indicated by each "Nega" and "Posi", synchronization type that is indicated by each "Sep," "CS," "GSync," and "TriSync", scan type that is indicated by each "Interlace" and "Non-Interlace", image line number, and vertical synchronizing signal width that have been detected by detector 30.

CPU 4 further sets the signal processing for the input video signal based on these determination results.

As an example, CPU 4 sets the frequency division rate and phase in the A/D converter (not shown) of synchronization processing circuit 2 based on these determination results. These settings cause synchronization processing circuit 2 to execute operations appropriate to the type of input video signal.

CPU 4 further sets the resolution conversion data, aspect ratio, and color system, which indicates whether the input video signal is an RGB signal or YCbCr signal, in scaler circuit 5 based on these determination results. The aspect ratio is contained in the determination results.

For example, upon determining that the input video signal is an RGB signal, CPU 4 sets "100% scan of the panel" as the resolution conversion data to scaler circuit 5, and further, carries out color system settings that indicate that the input video signal is an RGB signal.

On the other hand, upon determining that the input video signal is a YCbCr signal, CPU 4 sets "105% overscan of the panel" as the resolution conversion data to scaler circuit 5, and further, carries out color-system settings that indicate that the input video signal is a YCbCr signal that is to be converted to an RGB signal.

Scaler circuit 5 processes the input video signal based on the settings that have been carried out by CPU 4. Scaler circuit 5 generates an image display signal for showing images by processing the input video signal and provides the image display signal to drive circuit 6.

For example, when the resolution conversion has been set by CPU 4, scaler circuit 5 converts the resolution of the input video signal in accordance with the resolution conversion.

Alternatively, when the aspect ratio is set by CPU 4, scaler circuit 5 changes the aspect of the image that corresponds to the input video signal into the aspect ratio that has been set.

When color-system settings, which indicate that the input video signal is an RGB signal, have been carried out by CPU 4, scaler circuit 5 does not convert the RGB signal into another video signal format.

When color-system settings, which indicate that the input video signal is a YCbCr signal that is to be converted to an RGB signal, have been carried out by CPU 4, scaler circuit 5 converts the YCbCr signal into an RGB signal.

Explanation next regards the operation.

When input terminal 1 receives a video signal, synchronization processing circuit 2 separates the synchronizing signals from the input video signal. Synchronization processing circuit 2 provides the synchronizing signals to detection circuit 3 and detection circuit 3A. Synchronization processing circuit 2 further provides the input video signal that has no synchronizing signal to scaler circuit 5.

Upon receiving the synchronizing signals, detection circuit 3 detects the horizontal synchronization frequency, vertical synchronization frequency, synchronization polarity, synchronization type ("Sep," "CS," or "GSync"), the scan type, and the image line number that are in the synchronizing signals. Detection circuit 3 then provides this detected information to CPU 4.

Upon receiving the synchronizing signals, detection circuit 3A detects the synchronization type ("TriSync") and vertical synchronization width from the synchronizing signals. Detection circuit 3A then provides this detected information to CPU 4.

When the synchronization type of the input video signal is "Sep" or "CS," CPU 4 determines that the input video signal is an RGB signal. CPU 4 then determines the type of input signal based on the image line number, the synchronization polarity, the vertical synchronizing signal, the horizontal synchronizing signal, and the scan type.

When the synchronization type is "GSync," CPU 4 determines whether the image line number is 480, 720, or 1080.

Figure 12:
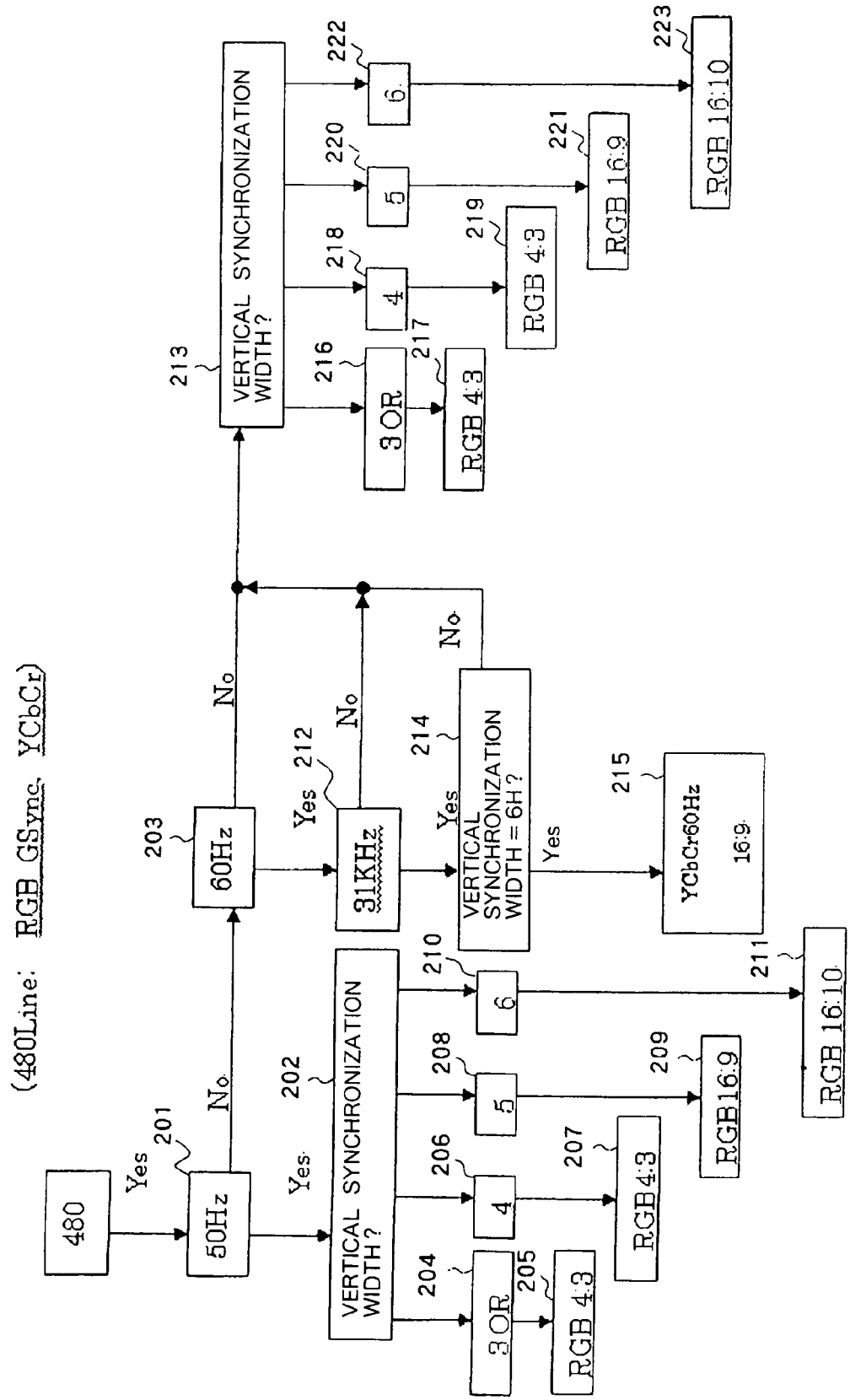
FIG. 12 is a flow chart explaining the operation for determining the type of input video signal.

FIG. 12 is a flow chart explaining the operation for determining the type of input video signal that is executed when the image line number is 480. The following explanation regards the determination operation when the image line number is 480 with reference to FIG. 12.

When the image line number is 480, CPU 4 executes Step 201.

In Step 201, CPU 4 determines whether vertical synchronization frequency is 50 Hz. If the vertical synchronization frequency is 50 Hz, CPU 4 executes Step 202 and Step 204, 206, 208, or 210. If the vertical synchronization frequency is not 50 Hz, CPU 4 executes Step 203.

In Step 202, CPU 4 checks the vertical synchronization width.

If CPU 4 determines that the vertical synchronization width is not 4 H, 5 H, or 6 H in Step 204, CPU 4 executes Step 205.

In Step 205, CPU 4 determines that the input video signal is an RGB signal having synchronization type "GSync," and further, determines that the aspect is 4:3.

If CPU 4 determines that the vertical synchronization width is 4 H in Step 206, CPU 4 executes Step 207.

In Step 207, CPU 4 determines that the input video signal is an RGB signal having synchronization type "GSync," and further, determines that the aspect is 4:3.

If CPU 4 determines that the vertical synchronization width is 5 H in Step 208, CPU 4 executes Step 209.

In Step 209, CPU 4 determines that the input video signal is an RGB signal having synchronization type "GSync," and further, determines that the aspect is 16:9.

If CPU 4 determines that the vertical synchronization width is 6 H in Step 210, CPU 4 executes Step 211.

In Step 211, CPU 4 determines that the input video signal is an RGB signal having synchronization type "GSync," and further determines that the aspect is 16:10.

On the other hand, CPU 4 determines whether the vertical synchronization frequency is 60 Hz in Step 203. If the vertical synchronization frequency is 60 Hz, CPU 4 executes Step 212, and if the vertical synchronization frequency is not 60 Hz, CPU 4 executes Step 213.

In Step 212, CPU 4 determines whether the horizontal synchronization frequency is 31 KHz. If the horizontal synchronization frequency is 31 KHz, CPU 4 executes Step 214. If the horizontal synchronization frequency is not 31 KHz, CPU 4 executes Step 213.

In Step 214, CPU 4 determines whether the vertical synchronization width is 6 H. If the vertical synchronization width is 6 H, CPU 4 executes Step 215, and if the vertical synchronization width is not 6 H, CPU 4 executes Step 213.

In Step 215, CPU 4 determines that the input video signal is a YCbCr signal having a vertical synchronization frequency of 60 Hz, and further, determines that the aspect is 16:9.

On the other hand, in Step 213, CPU 4 checks the vertical synchronization width and then executes Step 216, 218, 220 or 222.

If the vertical synchronization width is not 4 H, 5 H, or 6 H in Step 216, CPU 4 executes Step 217.

In Step 217, CPU 4 determines that the input video signal is an RGB signal having synchronization type "GSync," and further, determines that the aspect is 4:3.

If CPU 4 determines that the vertical synchronization width is 4 H in Step 218, CPU 4 executes Step 219.

In Step 219, CPU 4 determines that the input video signal it an RGB signal having synchronization type "GSync," and further, determines that the aspect is 4:3.

If the vertical synchronization width is 5 H in Step 220, CPU 4 executes Step 221.

In Step 221, CPU 4 determines that the input video signal is an RGB signal having synchronization type "GSync," and further, determines that the aspect is 16:9.

If CPU 4 determines that the vertical synchronization width is 6 H in Step 222, CPU 4 executes Step 223.

In Step 223, CPU 4 determines that the input video signal is an RGB signal having synchronization type "GSync," and further, determines that the aspect is 16:10.

In this way, CPU 4 determines that the aspect is 16:9, and further, determines that the color system is YCbCr when the image line number is 480, and when the vertical synchronization frequency of the input video signal is 60 Hz, the horizontal synchronization frequency is 31 KHz, and moreover, the vertical synchronization width is 6 H, i.e., when a component signal of 720×480 (60 Hz) is received as input.

When an RGB signal is received, CPU 4 is able to select the aspect (4:3, 16:9, or 16:10) and color system (RGB signal), which correspond to the type of input video signal, based on processes that are executed in accordance with the flow chart shown in FIG. 12.

Figure 13:
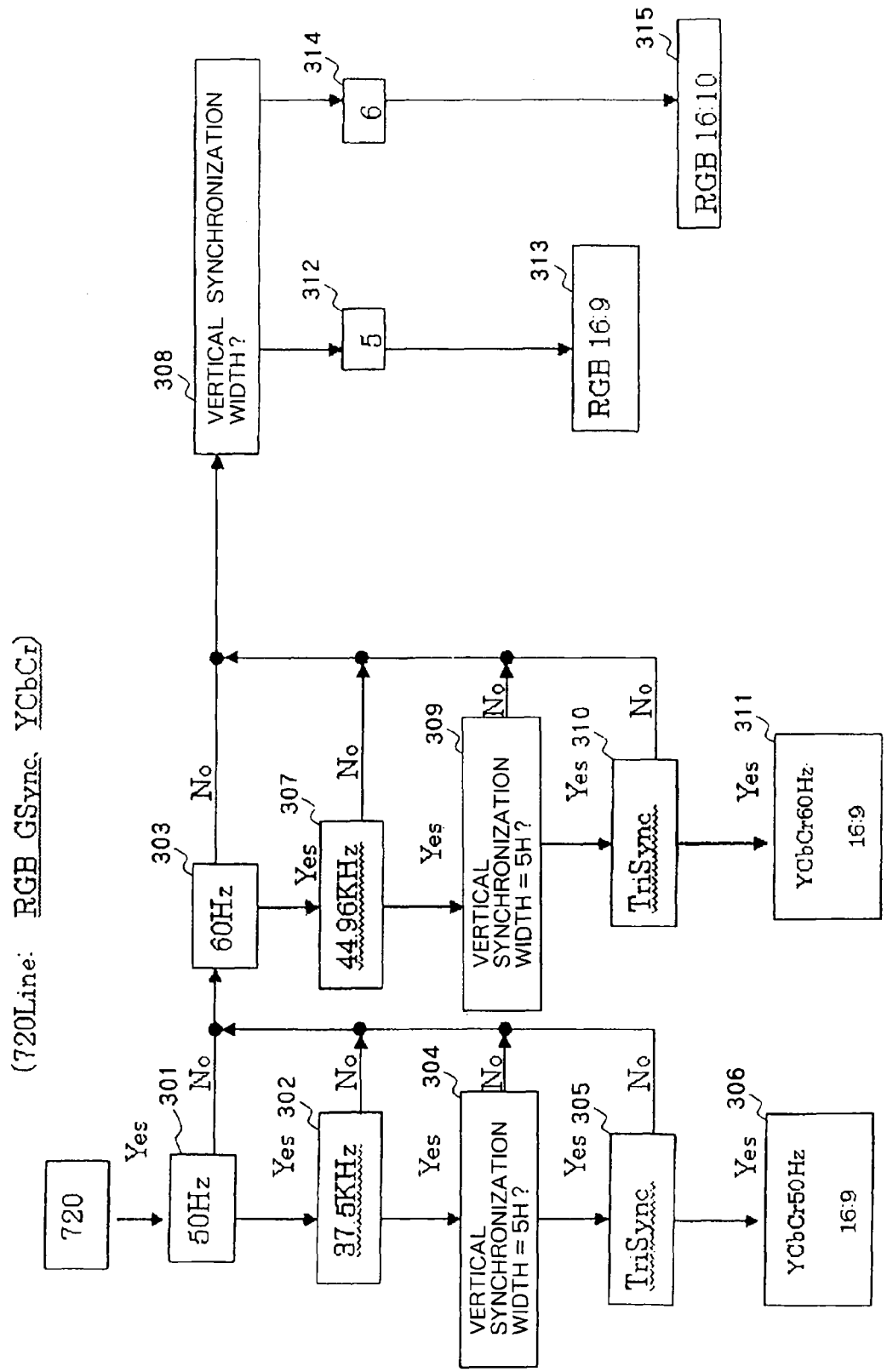
FIG. 13 is a flow chart explaining the operation for determining the type of input video signal.

FIG. 13 is a flow chart explaining the operation for determining the type, of input video signal that is executed when the image line number is 720. Referring to FIG. 13, the following explanation regards the determination operation when the image line number is 720.

When the image line number is 720, CPU 4 executes Step 301. In Step 301, CPU 4 determines whether the vertical synchronization frequency is 50 Hz. If the vertical synchronization frequency is 50 Hz, CPU 4 executes Step 302, but if the vertical synchronization frequency is not 50 Hz, CPU 4 executes Step 303.

In Step 302, CPU 4 determines whether the horizontal synchronization frequency is 37.5 KHz. If the horizontal synchronization frequency is 37.5 KHz, CPU 4 executes Step 304, but if the horizontal synchronization frequency is not 37.5 KHz, CPU 4 executes Step 303.

In Step 304, CPU 4 determines whether the vertical synchronization width is 5 H. If the vertical synchronization width is 5 H, CPU 4 executes Step 305, but if the vertical synchronization width is not 5 H, CPU 4 executes Step 303.

In Step 305, CPU 4 determines whether the synchronization type is "TriSync." If the synchronization type is "TriSync," CPU 4 executes Step 306, but if the synchronization type is not TriSync, CPU 4 executes Step 303.

In Step 306, CPU 4 determines that the input video signal is a YCbCr signal having a vertical synchronization frequency of 50 Hz, and moreover, determines that the aspect is 16:9.

In Step 303, on the other hand, CPU 4 determines whether the vertical synchronization frequency is 60 Hz. If the vertical synchronization frequency is 60 Hz, CPU 4 executes Step 307, but if the vertical synchronization frequency is not 60 Hz, CPU 4 executes Step 308.

In Step 307, CPU 4 determines whether the horizontal synchronization frequency is 44.9 KHz. If the horizontal synchronization frequency is 44.96 KHz, CPU 4 executes Step 309, but if the horizontal synchronization frequency is not 44.96 KHz, CPU 4 executes Step 308.

In Step 309, CPU 4 determines whether the vertical synchronization width is 5 H. If the vertical synchronization width is 5 H, CPU 4 executes Step 310, but if the vertical synchronization width is not 5 H, CPU 4 executes Step 308.

In Step 310, CPU 4 determines whether the synchronization type is "TriSync." If the synchronization type is "TriSync," CPU 4 executes Step 311, but if the synchronization type is not "TriSync," CPU 4 executes Step 308.

In Step 311, CPU 4 determines that the input video signal is a YCbCr signal whose vertical synchronization frequency is 60 Hz, and moreover, determines that the aspect is 16:9.

In Step 308, on the other hand, CPU 4 checks the vertical synchronization width and then executes either Step 312 or Step 314.

If the vertical synchronization width is 5 H in Step 312, CPU 4 executes Step 313.

In Step 313, CPU 4 determines that the input video signal is an RGB signal having synchronization type "GSync," and further, determines that the aspect is 16:9.

If the vertical synchronization width is 6 H in Step 314, CPU 4 executes Step 315.

In Step 315, CPU 4 determines that the input video signal is an RGB signal having synchronization type "GSync," and further, determines that the aspect is 16:10.

In this way, CPU 4 determines that the aspect is 16:9 and further determines that the color system is YCbCr when the image line number is 720, and further, when the vertical synchronization frequency of the input video signal is 50 Hz, the horizontal synchronization frequency is 37.5 KHz, the vertical synchronization width is 5 H, and further the synchronization type is "TriSync," i.e., when a component signal of 1280×720 (50 Hz) is received as input.

Alternatively, CPU 4 determines that the aspect is 16:9 and further determines that the color system is YCbCr when the image line number is 720, and further, the vertical synchronization frequency of the input video signal is 60 Hz, the horizontal synchronization frequency is 44.96 KHz, the vertical synchronization width is 5 H, and further, the synchronization type is "TriSync," i.e., when a component signal of 1280×720 (60 Hz) is received as input.

Alternatively, when an RGB signal is received, CPU 4 is able to select the aspect (16:9, 16:10) and color system (RGB signal), which correspond to the type of input video signal, based on processes that are executed in accordance with the flow chart that is shown in FIG. 13.

Figure 14:
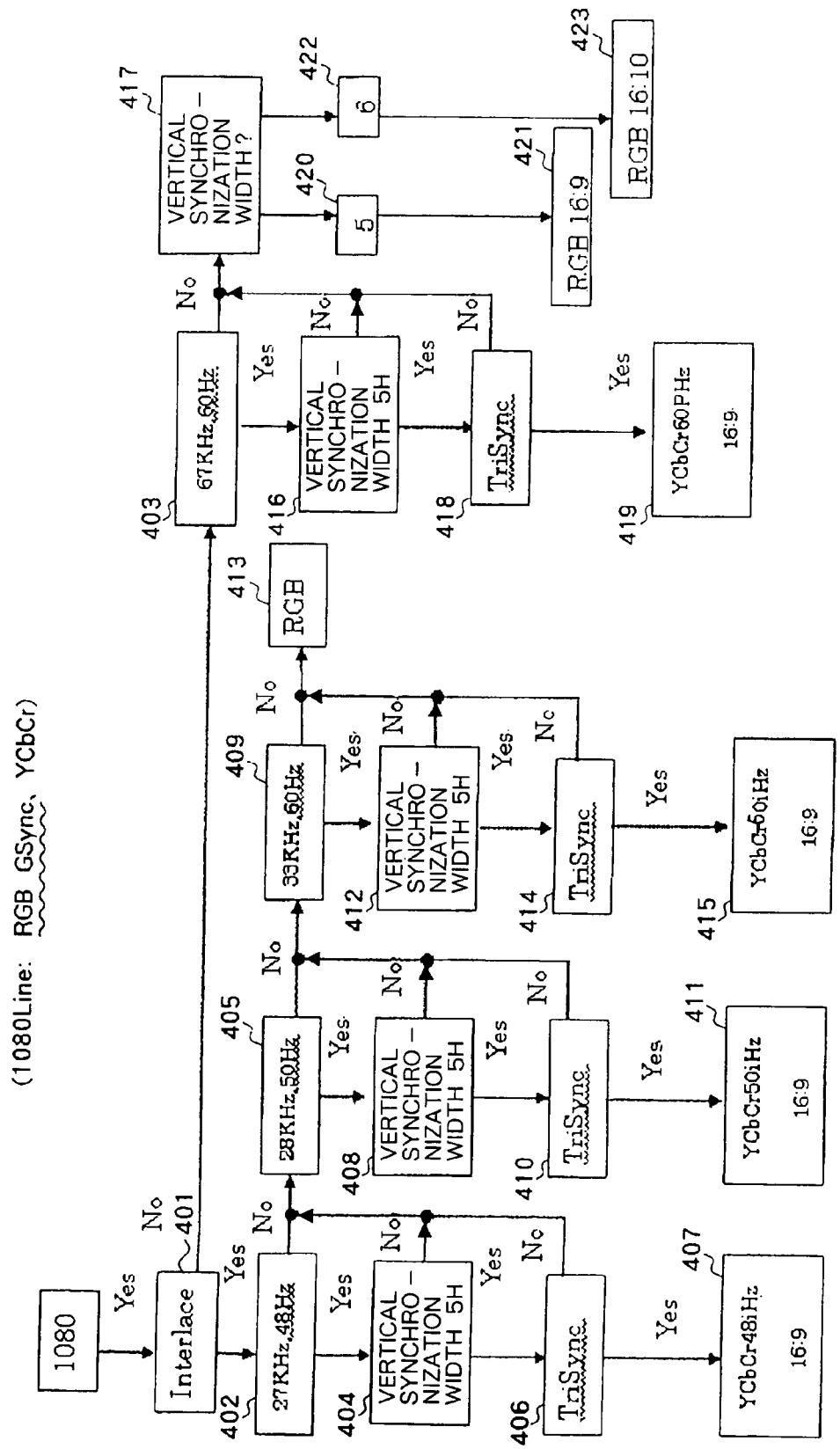
FIG. 14 is a flow chart explaining the operation for determining the type of input video signal.

FIG. 14 is a flow chart explaining the operation for determining the type of input video signal that is executed when the image line number is 1080. Referring to FIG. 14, the following explanation regards the determination operation when the image line number is 1080.

When the image line number is 1080, CPU 4 executes Step 401.

In Step 401, CPU 4 determines whether the scan type is "Interlace." If the scan type is "Interlace," CPU 4 executes Step 402, but if the scan type is not "Interlace," CPU 4 executes Step 403.

In Step 402, CPU 4 determines whether the horizontal synchronization frequency is 27 KHz, and further, determines whether the vertical synchronization frequency is 48 Hz. If the horizontal synchronization frequency is 27 KHz, and moreover, if the vertical synchronization frequency is 48 Hz, CPU 4 executes Step 404. If the horizontal synchronization frequency is not 27 KHz, CPU 4 executes Step 405. If the vertical synchronization frequency is not 48 Hz, CPU 4 executes Step 405.

In Step 404, CPU 4 determines whether the vertical synchronization width is 5 H. If the vertical synchronization width is 5 H, CPU 4 executes Step 406, but if the vertical synchronization width is not 5 H, CPU 4 executes Step 405.

In Step 406, CPU 4 determines whether the synchronization type is "TriSync." If the synchronization type is "TriSync," CPU 4 executes Step 407, but if the synchronization type is not "TriSync," CPU 4 executes Step 405.

In Step 407, CPU 4 determines that the input video signal is a YCbCr signal whose vertical synchronization frequency is 48 Hz and whose scan type is "Interlace," and further determines that the aspect is 16:9.

On the other hand, CPU 4 determines in Step 405 whether the horizontal synchronization frequency is 28 KHz, and moreover, whether the vertical synchronization frequency is 50 Hz. If the horizontal synchronization frequency is 28 KHz, and moreover, if the vertical synchronization frequency is 50 Hz, CPU 4 executes Step 408. If the horizontal synchronization frequency is not 28 KHz, CPU 4 executes Step 409. If the vertical synchronization frequency is not 50 Hz, CPU 4 executes Step 409.

In Step 408, CPU 4 determines whether the vertical synchronization width is 5 H. If the vertical synchronization width is 5 H, CPU 4 executes Step 410, but if the vertical synchronization width is not 5 H, CPU 4 executes Step 409.

In Step 410, CPU 4 determines whether the synchronization type is "TriSync." If the synchronization type is "TriSync," CPU 4 executes Step 411, but if the synchronization type is not "TriSync," CPU 4 executes Step 409.

In Step 411, CPU 4 determines that the input video signal is a YCbCr signal whose vertical synchronization frequency is 50 Hz and whose scan type is "Interlace," and moreover, determines that the aspect is 16:9.

In Step 409, on the other hand, CPU 4 determines whether the horizontal synchronization frequency is 33 KHz, and moreover, whether the vertical synchronization frequency is 60 Hz. If the horizontal synchronization frequency is 33 KHz and the vertical synchronization frequency is 60 Hz, CPU 4 executes Step 412. If the horizontal synchronization frequency is not 33 KHz, CPU 4 executes Step 413. If the vertical synchronization frequency is not 60 Hz, CPU 4 executes Step 413.

In Step 412, CPU 4 determines whether the vertical synchronization width is 5 H. If the vertical synchronization width is 5 H, CPU 4 executes Step 414, but if the vertical synchronization width is not 5 H, CPU 4 executes Step 413.

In Step 414, CPU 4 determines whether the synchronization type is "TriSync." If the synchronization type is "TriSync," CPU 4 executes Step 415, but if the synchronization type is not "TriSync," CPU 4 executes Step 413.

In Step 415, CPU 4 determines that the input video signal is a YCbCr signal whose vertical synchronization frequency is 60 Hz and whose scan type is "Interlace," and further determines that the aspect is 16:9.

In Step 413, on the other hand, CPU 4 determines that the input video signal may be an RGB signal. In Step 413, CPU 4 may also conclude that determination is not possible.

Alternatively, in Step 403, CPU 4 determines whether the horizontal synchronization frequency is 67 KHz, and further, whether the vertical synchronization frequency is 60 Hz . If the horizontal synchronization frequency is 67 KHz, and further, if the vertical synchronization frequency is 60 Hz, CPU 4 executes Step 416. If the horizontal synchronization frequency is not 67 KHz, CPU 4 executes Step 417; and if the vertical synchronization frequency is not 60 Hz, CPU 4 executes Step 417.

In Step 416, CPU 4 determines whether the vertical synchronization width is 5 H. If the vertical synchronization width is 5 H, CPU 4 executes Step 418, but if the vertical synchronization width is not 5 H, CPU 4 executes Step 417.

In Step 418, CPU 4 determines whether the synchronization type is "TriSync." If the synchronization type is "TriSync," CPU 4 executes Step 419, but if the synchronization type is not "TriSync," CPU 4 executes Step 417.

In Step 419, CPU 4 determines that the input video signal is a YCbCr signal whose vertical synchronization frequency is 60 Hz and whose scan type is "Non-Interlace," and further, determines that the aspect is 16:9.

On the other hand, in Step 417, CPU 4 checks the vertical synchronization width, and then executes either Step 420 or Step 422.

If the vertical synchronization width is 5 H in Step 420, CPU 4 executes Step 421.

In Step 421, CPU 4 determines that the input video signal is an RGB signal whose synchronization type is "GSync," and further, determines that the aspect is 16:9.

If the vertical synchronization width is 6 H in Step 422, CPU 4 executes Step 423.

In Step 423, CPU 4 determines that the input video signal is an RGB signal whose synchronization type is "GSync," and further, determines that the aspect is 16:10.

In this way, CPU 4 determines that the aspect is 16:9, and further, that the color system is YCbCr when the image line number is 1080, and further, when the scan type of the input video signal is "Interlace," the vertical synchronization frequency is 48 Hz, the horizontal synchronization frequency is 27 KHz, the vertical synchronization width is 5 H, and further, the synchronization type is "TriSync," i.e., when a 1920× 1080i (48 Hz) component signal is received as input.

Alternatively, CPU 4 determines that the aspect is 16:9 and further determines that the color system is YCbCr when the image line number is 1080, and further, the scan type of the input video signal is "Interlace," the vertical synchronization frequency is 50 Hz, the horizontal synchronization frequency is 28 KHz, the vertical synchronization width is 5 H, and moreover, the synchronization type is "TriSync," i.e., when a 1920×1080i (50 Hz) component signal is received as input.

On the other hand, CPU 4 determines that the aspect is 16:9 and further determines that the color system is YCbCr when the image line number is 1080, and further, the scan type of the input video signal is "Interlace," the vertical synchronization frequency is 60 Hz, the horizontal synchronization frequency is 33 KHz, the vertical synchronization width is 5 H, and moreover, the synchronization type is "TriSync," i.e., when a 1920×1080i (60 Hz) component signal is received as input.

CPU 4 determines that the aspect is 16:9, and further, determines that the color system is YCbCr when the image line number is 1080, and further, when the scan type of the input video signal is "Non-Interlace," the vertical synchronization frequency is 60 Hz, the horizontal synchronization frequency is 67 KHz, the vertical synchronization width is 5 H, and the synchronization type is "TriSync," i.e., when a 1920×1080 (60 Hz) component signal is received as input.

When an RGB signal is received, CPU 4 is able to select the aspect (16:9 or 16:10) and the color system (RGB signal), which correspond to the type of input video signal, based on processes that are executed in accordance with the flow chart shown in FIG. 14.

CPU 4 further determines the type of input video signal based on the above-described determination results and the information that is provided from detection circuit 3 (for example, the synchronization polarity).

CPU 4 sets the frequency-division ratio and phase in A/D converter (not shown) of synchronization processing circuit 2 based on these determination results. These settings cause synchronization processing circuit 2 to execute operations appropriate to the type of input video signal that is received.

In addition, CPU 4 sets the resolution conversion data, the aspect ratio, and the color system, which indicate whether the input video signal is an RGB signal or a YCbCr signal, in scaler circuit 5, based on the above-described determination results. The aspect ratio is included in the determination results.

More specifically, upon determining that the input video signal is an-RGB signal, CPU 4 sets "100% scan of the panel" as the resolution conversion data in scaler circuit 5, and further, carries out color-system settings that indicate that the input video signal is an RGB signal.

Alternatively, upon determining that the input video signal is a YCbCr signal, CPU 4 sets "105% overscan of the panel" as the resolution conversion data in scaler circuit 5, and further carries out color-system settings that indicate that the input video signal is a YCbCr signal that is to be converted to an RGB signal.

Based on the settings carried out by CPU 4, scaler circuit 5 processes the input video signal. By processing the input video signal, scaler circuit 5 generates an image display signal for showing images and provides this image display signal to drive circuit 6.

More specifically, when the resolution conversion data have been set by CPU 4, scaler circuit 5 converts the resolution of the input video signal in accordance with the resolution conversion data.

When the aspect ratio has been set by CPU 4, scaler circuit 5 further changes the aspect of the images that accords with the input video signal to the aspect ratio that has been set.

In addition, when color-system settings, which indicate that the input video signal is an RGB signal, have been carried out by CPU 4, scaler circuit 5 does not convert the RGB signal to another image signal format.

When color-system settings, which indicate that the input video signal is a YCbCr signal that is to be converted to an RGB signal, have been carried out by CPU 4, scaler circuit 5 converts the YCbCr signal to an RGB signal.

Drive circuit 6 drives panel 7 based on the image display signal that is provided from scaler circuit 5, whereby images are formed on panel 7.

The images formed on panel 7 are, for example, projected onto screen 8 by means of a projection light source (not shown).

According to the embodiment, CPU 4 determines the type of input video signal in accordance with the synchronization type and vertical synchronizing signal width.

As a result, an RGB signal for which the type of video signal could not be accurately determined, and more specifically, an RGB signal for which the synchronization type is "GSync" and for which the timing of the horizontal synchronization frequency and vertical synchronization frequency approaches that of a component signal, can be determined using the synchronization type (TriSync) and the vertical synchronizing signal width.

In addition, the embodiment allows the elimination of complex processing, which was necessary in the prior art, that includes the calculation of RGB probability and color-difference probability, and further, the determination of the type of input video signal in accordance with these calculation results.

Accordingly, the embodiment enables a high accurate determination of the type of video signal without using RGB probability or color-difference probability.

In addition, in the embodiment, CPU 4 determines the type of video signal based on the horizontal synchronization frequency, the vertical synchronization frequency, the synchronization polarity, the synchronization type, the scan type, the image line number, and the vertical synchronizing signal width.

In this case, the type of video signal can be determined with higher accuracy.

In the embodiment, CPU 4 further controls the processing of a video signal based on these determination results.

As a result, images can be accurately displayed in accordance with the video signal.

In the embodiment, input terminal 1 receives RGB signals and YCbCr signals. In addition, detector 30 detects each "Nega" and "Posi" as the synchronization polarity, detects each "Sep," "CS," "GSync," and "TriSync" as the synchronization type, and detects each "Interlace" and "Non-Interlace" as the scan type.

In this case, the type of video signal can be determined with high accuracy without confusion between RGB signals and YCbCr signals While a preferred embodiment of the present invention has been described using specific terms, such description is for illustrative purposes only, and it is to be understood that changes and variations may be made without departing from the spirit or scope of the following claims.

What is claimed is:

1. A video signal determination device, comprising:
 a synchronization separator for separating synchronizing signals from a video signal that contains said synchronizing signals;
 a detector for detecting synchronization type and vertical synchronizing signal width that are contained in the synchronizing signals that have been separated by said synchronization separator; and
 a determination unit for determining a type of said video signal based on detection results of said detector,
 wherein said detector further detects horizontal synchronization frequency, vertical synchronization frequency, synchronization polarity, scan type, and image line number that are contained in said synchronizing signals;
 said synchronization separator separates said synchronizing signals from each RGB signal and from each YCrCb signal that are used as said video signal;
 said synchronization polarity is indicated by "Nega" and "Posi";
 said synchronization type is indicated by "Separate Sync," "Composite Sync," "Sync-on-G," and "Tri-State-Sync"; and
 said scan type is indicated by "Interlace" and "Non-Interlace".

2. An image display device, comprising:
 a processor for processing a video signal that contains synchronizing signals:,
 a display unit for displaying images based on the video signal that has been processed by said processor;
 a synchronization separator for separating said synchronizing signals from said video signal;
 a detector for detecting synchronization type and vertical synchronizing signal width that are contained in the synchronizing signals that have been separated by said synchronization separator; and
 an image control unit for determining a type of said video signal based on detection results of said detector and controlling said processor in accordance with the type of said video signal,
 wherein said detector further detects horizontal synchronization frequency, vertical synchronization frequency, synchronization polarity, scan type, and image line number that are contained in said synchronizing signals;
 said processor processes each RGB signal and each YCbCr signal that are used as the video signal;
 said synchronization separator separates said synchronizing signals from each RGB signal and each YCrCb signal;
 said synchronization polarity is indicated by "Nega" and "Posi";
 said synchronization type is indicated by "Separate Sync," "Composite Sync," "Sync-on-G," and "Tri-State-Sync"; and
 said scan type is indicated by "Interlace" and "Non-Interlace".

3. A video signal determination method, comprising:

separating synchronizing signals from a video signal that contains said synchronizing signals;

detecting synchronization type and vertical synchronizing signal width that are contained in said synchronizing signals; and determining a type of said video signal based on results of said detecting, wherein said detecting further includes detecting horizontal synchronization frequency, vertical synchronization frequency, synchronization polarity, scan type, and image line number that are contained in said synchronizing signals;

said separating includes separating said synchronizing signals from each RGB signal and from YCbCr signal that are used as said video signal;

said synchronization polarity is indicated by "Nega" and "Posi";

said synchronization type is indicated by "Separate Sync," "Composite Sync," "Sync-on-G," and "Tri-State-Sync"; and said scan type is indicated by "Interlace" and "Non-Interlace".

4. An image display method, comprising:

separating synchronizing signals from a video signal that contains said synchronizing signals;

detecting synchronization type and vertical synchronizing signal width that are contained in said synchronizing signals;

determining type of said video signal based on results of said detecting;

controlling the processing of said video signal in accordance with results of said determining; and displaying images based on said video signal that has undergone said processing, wherein said detecting further includes detecting horizontal synchronization frequency, vertical synchronization frequency, synchronization polarity, scan type, and image line number that are contained in said synchronizing signals;

said separating includes separating said synchronizing signals each RGB signal and from each YCbCr signal that are used as the video signal;

said synchronization polarity is indicated by "Nega" and "Posi";

said synchronization type is indicated by "Separate Sync," "Composite Sync," "Sync-on-G," and "Tri-State-Sync"; and said scan type is indicated by "Interlace" and "Non-Interlace".

* * * * *